United States Patent
Nakanishi et al.

(10) Patent No.: US 7,033,678 B2
(45) Date of Patent: Apr. 25, 2006

(54) RESIN COATED METAL SHEET

(75) Inventors: Hironobu Nakanishi, Kobe (JP); Kazuhisa Fujisawa, Kobe (JP); Hiroo Shige, Kakogawa (JP); Masatoshi Iwai, Kakogawa (JP)

(73) Assignee: Kobe Steel, Ltd., Kobe (JP)

( * ) Notice: Subject to any disclaimer, the term of this patent is extended or adjusted under 35 U.S.C. 154(b) by 0 days.

(21) Appl. No.: 10/831,231

(22) Filed: Apr. 26, 2004

(65) Prior Publication Data

US 2004/0224170 A1    Nov. 11, 2004

(30) Foreign Application Priority Data

May 9, 2003    (JP) ............................. 2003-131825

(51) Int. Cl.
  *B32B 15/04*    (2006.01)
  *B32B 15/092*    (2006.01)
  *B32B 15/18*    (2006.01)

(52) U.S. Cl. .................. 428/659; 428/418; 428/469; 428/472.3; 428/704

(58) Field of Classification Search ............... 428/659, 428/457, 418, 425.8, 469, 472.3, 472.2, 704
See application file for complete search history.

(56) References Cited

U.S. PATENT DOCUMENTS

| | | | |
|---|---|---|---|
| 4,853,285 A * | 8/1989 | Sobata et al. ............... 428/336 |
| 5,274,021 A | 12/1993 | Geeck et al. ............... 524/417 |
| 5,429,880 A * | 7/1995 | Kubota et al. ............... 428/623 |
| 6,479,103 B1 | 11/2002 | Wichelhaus et al. ......... 427/327 |
| 6,835,459 B1* | 12/2004 | Lorenz et al. ............... 428/469 |
| 2002/0151635 A1 | 10/2002 | Gray et al. ................... 524/439 |
| 2003/0064256 A1 | 4/2003 | Sadvary et al. ............. 428/704 |
| 2003/0175541 A1 | 9/2003 | Lorenz et al. ............... 428/546 |
| 2004/0084657 A1* | 5/2004 | Pawlik et al. ............... 252/500 |

FOREIGN PATENT DOCUMENTS

| | | |
|---|---|---|
| JP | 11-5269 | 1/1999 |
| WO | WO 01/85860 | 11/2001 |
| WO | WO 01/85860 A1 | 11/2001 |
| WO | WO 03/062327 | 7/2003 |
| WO | WO 03/062328 | 7/2003 |
| WO | WO 2004/018576 | 3/2004 |

* cited by examiner

*Primary Examiner*—Michael E. Lavilla
(74) *Attorney, Agent, or Firm*—Oblon, Spivak, McClelland, Maier & Neustadt, P.C.

(57) ABSTRACT

A resin coated metal sheet of the invention has an epoxy resin layer on a galvanized metal sheet, wherein the resin layer contains iron phosphide and at least one selected from the group consisting of aluminum triphosphate, calcium ion exchange silica and amorphous magnesium silicate compound. In the resin coated metal sheet, the epoxy resin is an urethane modified epoxy resin and/or dimer acid modified epoxy resin, and the iron phosphide has a maximum particle diameter of 15 μm or less. The resin coated metal sheet has excellent weldability, formability and corrosion resistance.

12 Claims, 3 Drawing Sheets

OBSERVATION SITE OF AN OVERLAPPING PORTION

SPACER 120 μm

RESIN COATED METAL SHEET

BACKGROUND OF THE INVENTION

1. Field of the Invention

The present invention belongs to the technical field of a resin coated metal sheet, specifically, the technical field of a resin coated metal sheet having an epoxy resin layer on a galvanized metal sheet, particularly a coated steel sheet for automobiles which enables the omission of part of a coating step in the production of an automobile and the omission of the filling of a grease into a bent portion or the like.

2. Description of the Related Art

JP-A 11-5269 (the term "JP-A" as used herein means an "unexamined published Japanese patent application") discloses a resin coated metal sheet having a resin coating layer on a galvanized metal sheet or aluminum plated metal sheet.

Although a resin, a curing agent and conductive pigment contained in a coating are set forth in claims of JP-A 11-5269, corrosion preventing additives are merely enumerated in the section "Detailed Description of the Invention".

Expressions for the thickness "t" (μm) of a coating film and the content "P" (wt %) of the conductive pigment in the coating film are given in claims of JP-A 11-5269. These expressions are the following expressions (1) and (2). In these expressions (1) and (2), when $t=7$, $39 \leq P \leq 71$.

$$P \geq 7.14t - 10.71 \quad (1)$$

$$P \leq 7.14t + 21.43 \quad (2)$$

Epoxy resin, urethane resin, acrylic resin, polyester resin and modified resins thereof are disclosed as the resin. Isocyanate compounds and/or alkyl etherified amino formaldehyde resin (alkylated melamine resin) are disclosed as the curing agent.

JP-A 2000-522923 discloses a coating composition (coating film) for covering an amorphous metal.

Types and amounts of a resin, curing agent, rust-proof pigment and conductive pigment are defined in claims of JP-A 2000-522923.

Epoxy resin (including epoxy resin having an epoxy group such as dimer acid modified epoxy resin)+blocked polyurethane resin are disclosed as the resin. Guanidine, substituted guanidine, substituted urine, cyclic tertiary amine and mixtures thereof are disclosed as the curing agent. A silicate compound (0 to 15 wt %) is disclosed as the rust-proof pigment. Zinc, aluminum, graphite and/or molybdenum disulfide, carbon black and iron phosphide (40 to 70 wt %) are disclosed as the conductive pigment. The amount of the solvent is 0 to 30 wt %.

The patent JP-A 11-5269 discloses the relationship among the thickness of the coating film, the amount of the conductive pigment, weldability, formability and adhesion but not corrosion resistance which is an important evaluation item in examples at all and attaches importance to weldability and formability. Therefore, it is unknown whether the resin coated metal sheet of the above patent document 1 has excellent corrosion resistance or not.

Meanwhile, JP-A 2001-522923 mainly describes corrosion resistance and fails to disclose weldability and formability. Therefore, it is unknown whether the coating composition of the above patent document has excellent weldability and corrosion resistance.

Consequently, it is unknown whether what are disclosed by the above patent documents are excellent in all of weldability, formability and corrosion resistance and it is possible that they are not excellent in any one of them.

SUMMARY OF THE INVENTION

In view of the above situation, it is an object of the present invention to provide a resin coated metal sheet which has excellent weldability, formability and corrosion resistance.

The inventors of the present invention have conducted intensive studies to attain the above object and have accomplished the present invention. The present invention relates to a resin coated metal sheet having excellent weldability, formability and corrosion resistance and a manufacturing process thereof, which can attain the above object.

The present invention which has been accomplished and could attain the above object relates to a resin coated metal sheet which has the following constitutions.

That is, the resin coated metal sheet according to the present invention is a resin coated metal sheet comprising: a metal sheet; and a resin layer comprising an epoxy resin which is formed on the metal sheet, wherein said resin layer contains iron phosphide; at least one selected from the group consisting of aluminum triphosphate, calcium ion exchange silica and amorphous magnesium silicate compound; and a curing agent.

In the resin coated metal sheet according to the above construction, the metal sheet can be a galvanized steel sheet.

In the resin coated metal sheet according to the above construction, the epoxy resin can be at least one of a urethane modified epoxy resin and a dimer acid modified epoxy resin.

In the resin coated metal sheet according to the above construction, the content of the iron phosphide is preferably 40 to 55 wt %, and the content of the at least one selected from the group consisting of aluminum triphosphate, calcium ion exchange silica and amorphous magnesium silicate compound is preferably 5 to 25 wt %.

In the resin coated metal sheet according to the above construction, the maximum particle diameter of the iron phosphide is preferably 15 μm or less.

The resin coated metal sheet of the present invention is excellent in weldability, formability and corrosion resistance. Therefore, it is suitable for use as a material (resin coated metal sheet) for applications in which welding and processing are carried out and corrosion resistance is required.

DESCRIPTION OF THE PREFERRED EMBODIMENTS

Figure 1:
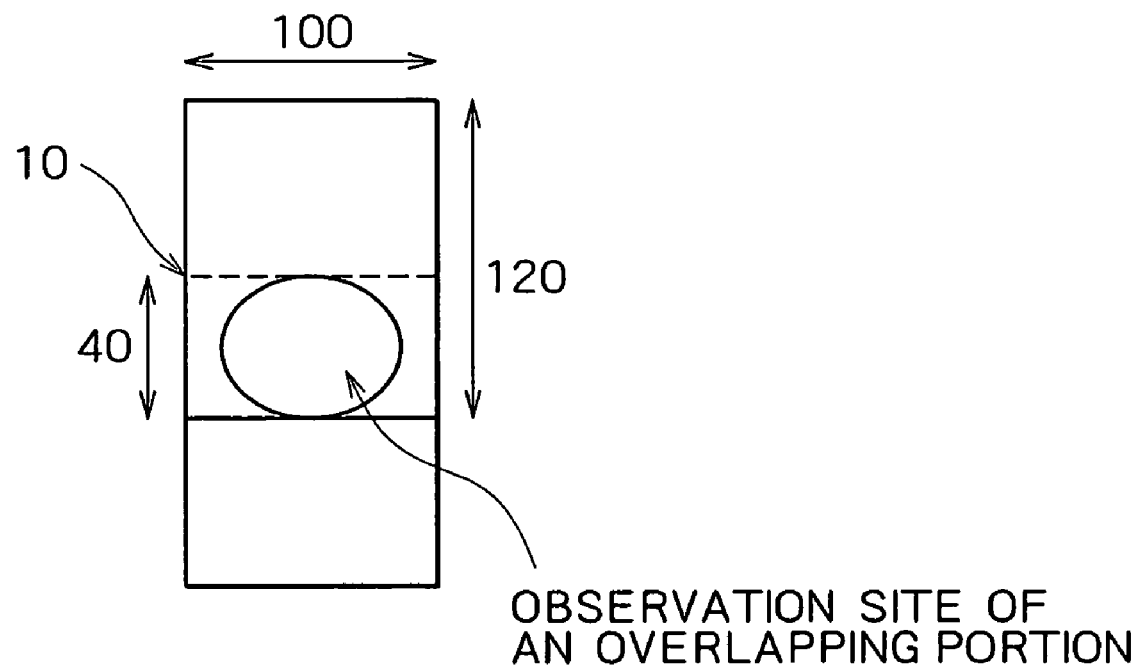
FIG. 1 is a schematic diagram showing the appearance of an overlapping sample used in a corrosion resistance evaluation test on the resin coated metal sheets of Examples and Comparative Examples of the present invention when seen from the front.

Basically, the present invention optimizes the type of a conductive coating and the type of a corrosion preventing additive and further the amount and particle diameter of the conductive coating and the amount of the corrosion preventing additive in order to obtain a resin coated metal sheet having excellent weldability, formability and corrosion resistance.

In the resin coated metal sheet of the present invention, iron phosphide which is a conductive filler is contained and at least one selected from the group consisting of aluminum triphosphate, calcium ion exchange silica and amorphous magnesium silicate compound is contained as a corrosion preventing additive (to be referred to as "corrosion preventing additive of the present invention" hereinafter).

When iron phosphide is contained, excellent weldability and formability are obtained. When the corrosion preventing additive of the present invention is contained, excellent corrosion resistance is obtained. Therefore, the resin coated metal sheet of the present invention has excellent weldability, formability and corrosion resistance.

Further, the amount and particle diameter of the above conductive coating and the amount of the corrosion preventing additive are optimized to enable the further improvement of weldability, formability and corrosion resistance.

The conductive filler is added to improve weldability. When iron phosphide is used as the conductive filler, not only weldability but also formability can be improved. A zinc (Zn) rich paint which is generally used to obtain a corrosion protecting effect and conductivity has a problem with formability because powdering readily occurs at the time of processing.

When the amount (content) of iron phosphide as the conductive filler is larger than 55% by mass (wt %), formability deteriorates though weldability is satisfactory. When the content is lower than 40 wt %, weldability deteriorates though formability is satisfactory. Therefore, the content of iron phosphide is desirably 40 to 55 wt %.

When the maximum particle diameter of iron phosphide as the conductive filler is larger than 15 µm, formability degrades. Therefore, the maximum particle diameter of iron phosphide is desirably 15 µm or less. The particle diameter of iron phosphide may be small. However, the lower limit of particle diameter is 6 µm, since iron phosphide having a particle diameter of 6 µm or less is hardly acquired.

A corrosion protecting agent is added to provide corrosion resistance. When the corrosion protecting agent of the present invention (at least one selected from the group consisting of aluminum triphosphate, calcium ion exchange silica and amorphous magnesium silicate compound) is contained, excellent corrosion resistance is obtained. Out of these three, aluminum triphosphate and amorphous magnesium silicate compound have a larger effect of improving corrosion resistance than calcium ion exchange silica and preferred in this respect.

When the amount (content) of the corrosion preventing additive of the present invention is larger than 25 wt %, formability deteriorates and when the content is lower than 5 wt %, corrosion resistance cannot be obtained. Therefore, the content of the corrosion preventing additive of the present invention is desirably 5 to 25 wt %. When only one of the above three substances is contained, the content of the corrosion preventing additive of the present invention is the content of the substance and when two or more of the above three substances are contained, the content of the corrosion preventing additive is the total content of these (total of the contents of the substances).

The upper limit of particle diameter of the corrosion preventing additive of the present invention is desirably 10 µm which is about the thickness of the coating film. This is because when the particle diameter of the corrosion preventing additive is larger than 10 µm, formability deteriorates.

Aluminum triphosphate exhibits excellent corrosion resistance due to the buffering function of pH and the formation of an immobile film. Though only aluminum triphosphate is used, aluminum triphosphate products treated with Mg and Ca may be used and are preferred. This is because they can exhibit more excellent corrosion resistance.

Calcium ion exchange silica exhibits more excellent corrosion resistance due to the buffering function of PH. The content of calcium in the calcium ion exchange silica is generally 1 to 10%.

The amorphous magnesium silicate compound exhibits corrosion resistance due to the buffering function of pH and the formation of an immobile film. The amorphous magnesium silicate compound is produced by filtering a precipitate formed by reacting an alkali metal-silicate with a water-soluble magnesium salt in an atomic Mg/Si ratio of 0.025 to 1.0 in an aqueous solution, rinsing, drying and grinding it. It can be confirmed by X-ray diffraction that the compound is amorphous.

Figure 4:
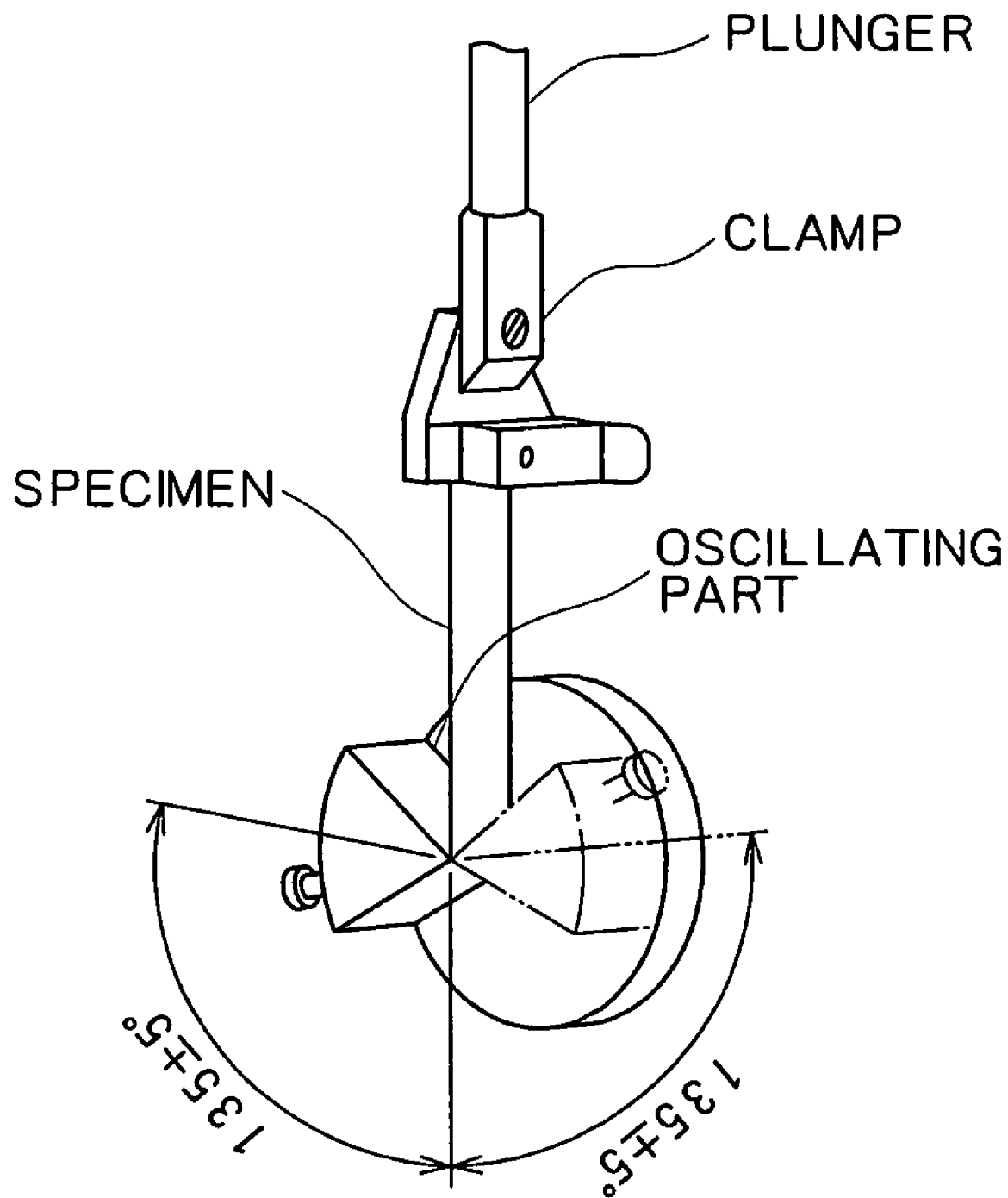
FIG. 4 is a schematic diagram of a bending test apparatus.

An epoxy resin is used as the resin for the resin layer in the present invention. This epoxy resin is preferably a flexible epoxy to improve formability (powdering resistance at the time of processing). The flexible epoxy is an epoxy which can be bent 300 times or more before it is broken in an MIT flexural test. The MIT flexural test was carried out by sandwiching one end of a specimen having a width of 15 mm and a length of 130 mm with the clamp of a testing device shown in FIG. 4 to bend it and moving the other end of the specimen at a tension of 1 kgf, a turning angle of 135° and a rotational vibration of 175 times/min to measure the number of times of bending before it was broken.

The above flexible epoxy is preferably one of the following epoxy resins:

(1) Urethane Modified Epoxy Resin:

This resin is obtained by introducing a urethane bond (resin) into the molecular structure of an epoxy resin so that flexibility is provided by the urethane resin structure.

(2) Dimer Acid Modified Epoxy Resin:

This resin is, for example, a mixture of the Epicoat 1007 bisphenol A type epoxy resin (trade name, manufactured by Japan Epoxy Resin Co., Ltd.) and the Epicoat 872 dimer acid modified epoxy resin (trade name, manufactured by Japan Epoxy Resin Co., Ltd.) in a ratio of 2/1.

In the present invention, blocked isocyanate, melamine resin or amine hardener is used as the curing agent. Out of these, blocked isocyanate and melamine resin react with the hydroxyl group of the epoxy resin. The amine hardener reacts with the epoxy group of the epoxy resin. The ratio of the equivalent of the reactive group in the epoxy resin to the equivalent of the reactive group in the curing agent is preferably 0.8 to 1.2.

The above blocked isocyanate, melamine resin and amine hardener are described hereinunder.

(1) Blocked Isocyanate:

This is obtained by blocking an isocyanate group with caprolactam or oxime. A blocking agent is dissociated at around 150° in the case of caprolactam. A blocking agent is dissociated at 120 to 130° in the case of oxime.

(2) Melamine Resin:

Examples of this melamine resin include n-butyletherified melamine resin, isobutyletherified melamine resin and methyletherified melamine resin.

(3) Amine Hardener:

This amine hardener is, for example, an aliphatic polyamine, alicyclic polyamine, aromatic polyamine or polyamide amine. Specific examples of these are given below.

<aliphatic polyamine>: diethylene triamine, dipropylene triamine, triethylene tetramine, tetraethylene pentamine, dimethylamino propylamine, diethylamino propylamine, dibutylamino propylamine, hexamethylene diamine, N-aminoethyl piperazine, bis-aminopropyl piperazine, trimethylhexamethylene diamine, etc.

<alicyclic polyamine>: 3,3'-dimethyl-4,4'-diaminodicyclohexylmethane, 3-amino-1-cyclohexylaminopropane, 4,4'-diaminodicyclohexylmethane, isophoronediamine, 1,3-bis(aminomethyl)cyclohexane, N-dimethylcyclohexylamine, heterocyclic diamines, etc.

<aromatic polyamine>: xylylene diamine, 4,4'-diaminodiphenylmethane, 4,4'-diaminodiphenyl ether, diaminodiphenylsulfone, m-phenylenediamine, etc.

<polyamide amine>: also called "polyamide resin" or "polyamino amide".

In the present invention, a galvanized metal sheet is preferably used as a base material (base sheet) to be covered with a resin layer. This galvanized metal sheet is obtained by galvanizing a metal sheet. The type of this metal sheet and the galvanizing method are not particularly limited, and various metal sheets and various galvanizing methods may be used. For example, an electro-galvanized steel sheet (EG) and galvannealed steel sheet (GA) may be used. When an electro-galvanized steel sheet is used, it is important to form an undercoat (treatment with a chromate or non-chromate (phosphoric acid-based)) before the formation of the resin layer. When a galvannealed steel sheet is used, an undercoat is not always necessary and may be or may not be formed. Other materials, such as aluminum plated steel sheet, zinc/aluminum plated steel sheet, zinc/aluminum/magnesium plated steel sheet, aluminum sheet and so on, can be used as the base material in the present invention.

EXAMPLES

Examples and Comparative Examples of the present invention will be provided hereinbelow. The present invention is not limited to these examples, and various changes and modifications may be made in the present invention without departing from the spirit and scope thereof and all are included in the technical scope of the present invention.

[1] Manufacture of Resin Coated Metal Sheet (Coating Procedure)

A galvannealed steel sheet having a non-chromate undercoat was prepared as the galvanized metal sheet which is a base material (base sheet). A resin layer was formed on this metal sheet to manufacture a resin coated metal sheet. This will be described in more detail hereinbelow.

(1) After the resin and the curing agent were mixed together in a predetermined ratio, iron phosphide (FeP) which is a conductive filler, corrosion preventing additive and anti-settling agent were added to the above mixture. The types of the resin and the curing agent used and the mixing ratio of these are shown in Table 1. The mixing ratio of FeP as a conductive filler and the type and mixing ratio of the corrosion preventing additive and the mixing ratio of the anti-settling agent are shown in Table 2.

A coating was prepared from the thus obtained mixture. That is, the mixture was added to a mixed solvent of xylene, propylene glycol monomethyl ether acetate and n-butanol in a ratio of 4/3/1, dissolved and dispersed in the mixed solvent to a solid content of 50% to obtain a coating.

(2) The thus obtained coating was stirred by a homogenizer at 300 rpm under cooling for 10 minutes.

(3) A bar coater was selected and the above coating was applied to the galvannealed steel sheet having a non-chromate undercoat to a target coating thickness of 10 μm.

(4) This coated steel sheet was heated in a continuous heating furnace at a PMT (the maximum temperature of the steel sheet) of 230° C. to remove the solvent and cure the coating film so as to obtain a resin coated metal sheet.

[2] Evaluation of Resin Coated Metal Sheet

The thus obtained resin coated metal sheet was tested for the evaluation of formability, weldability and corrosion resistance. The evaluation test methods will be described hereinunder.

A. Formability (1) Cylindrical drawing was carried out under the following conditions.

<Cylindrical Drawing Conditions>
blanking diameter of resin coated metal sheet (blank diameter for cylindrical drawing): 90 mm
punch diameter (outer diameter): 50 mm
die diameter (inner diameter): 52 mm
BHF (blank holder force, i.e. crinkling suppressing pressure): 980N
Cylindrical drawing rate: 160 mm/min (2) A tape was forcedly removed from the surface after the above cylindrical drawing. That is, an adhesive tape (Cellophane tape) was affixed to the surface of the cylindrical portion of a cylindrically drawn product obtained by the above cylindrical drawing (bottomed cylinder) and forcedly removed.

(3) A reduction in the weight ($W_d$) of the above cylindrically drawn product by affixing and removing the adhesive tape was measured. That is, the weight $W_1$ of the cylindrically drawn product before the adhesive tape was affixed to the product and the weight $W_2$ of the cylindrically drawn product after the adhesive tape was affixed and removed was measured to obtain a weight difference between them ($W_1-W_2=W_{1-2}$) which was divided by the surface area $S_d$ of the adhesive tape affixed portion of the cylindrically drawn product so as to obtain a weight reduction $W_d$ ($=W_{1-2}/S$).

(4) The criteria of formability are given below.

<Criteria of Formability>
weight reduction $W_d$: x, when it is 6 g/m² or more (poor formability)
weight reduction $W_d$: Δ, when it is 5 g/m² or more and less than 6 g/m² (superior to x and allowable range)
weight reduction $W_d$: ○, when it is 3 g/m² or more and less than 5 g/m² (high formability)
weight reduction $W_d$: ⊚, when it is less than 3 g/m² (superior to ○ and excellent)

B. Weldability

This was evaluated based on electrode life time under the following test conditions. That is, the welding was carried out on the surface of a resin coated metal sheet (resin coated side) under the following test conditions to obtain the number of spot welds so as to evaluate weldability.

<Test Conditions>
end diameter: 6 mm
pressure: 200 kgf
welding time: 12 cycles
welding current: 8.0 kA (2) The criteria of weldability are given below <Criteria of Weldability>
when the number of spot welds is smaller than 400: x (poor weldability)

when the number of spot welds is 400 or more and smaller than 600: Δ (superior to x and allowable range)
when the number of spot welds is 600 or more and smaller than 800: ○ (high weldability)
when the number of spot welds is 800 or more: ⊚ (superior to ○ and excellent)

C. Corrosion Resistance

Figure 2:
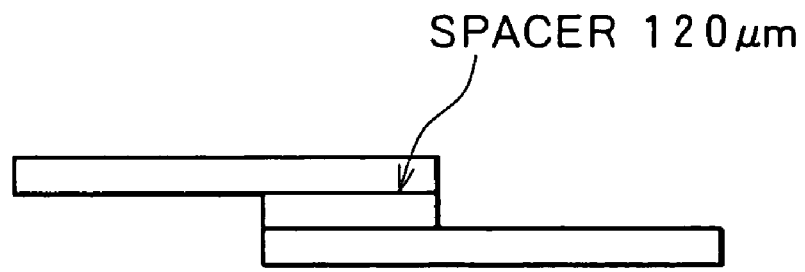
FIG. 2 is a schematic diagram showing the appearance of an overlapping sample used in a corrosion resistance evaluation test on the resin coated metal sheets of Examples and Comparative Examples of the present invention when seen from the side.
Figure 3:
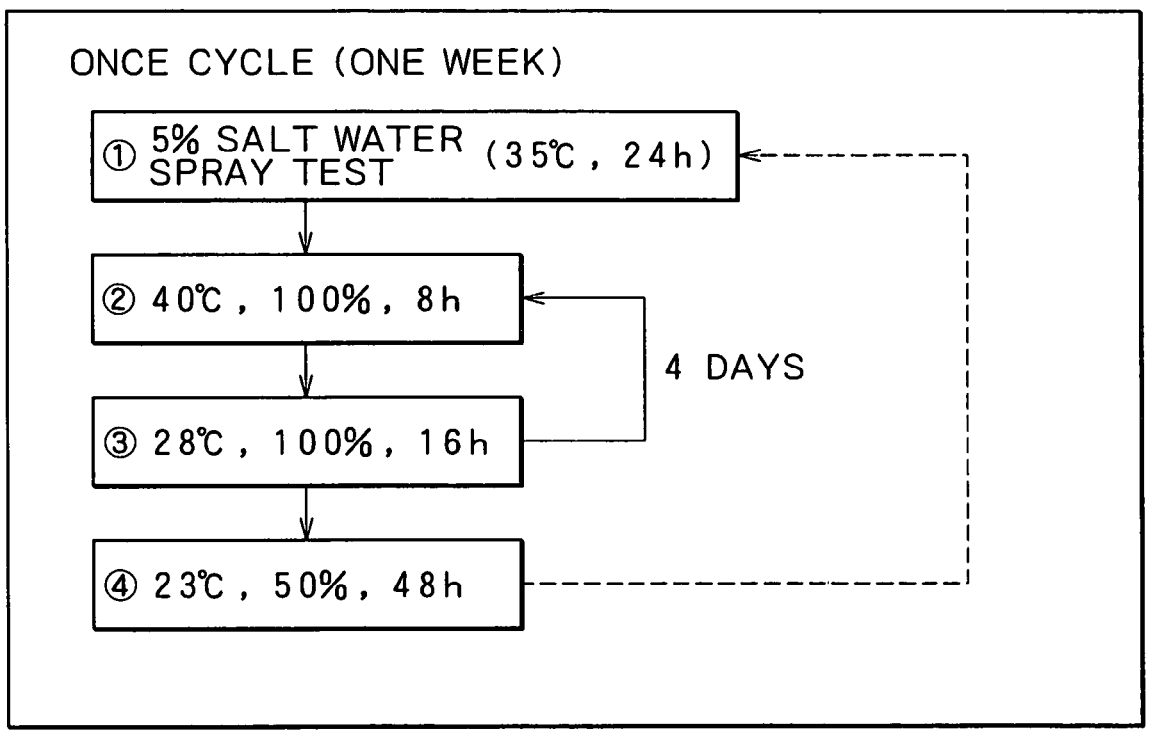
FIG. 3 is a diagram showing the corrosion resistance test cycle of the resin coated metal sheets of Examples and Comparative Examples of the present invention.

A corrosion resistance evaluation test is made on an overlapping portion.
(1) An overlapping sample was manufactured by using resin coated metal sheets and a spacer (thickness: 120 μm). FIG. 1 is a front view of this overlapping sample and FIG. 2 is a side view of the sample. The following treatments (in accordance with a general car coating method) were made on this overlapping sample.
a. alkali degreasing (with sodium orthosilicate at 40° C. for 2 minutes)
b. rinsing (30 sec)
c. phosphating (60° C.×2 minutes)
d. ED [cation electrocoating: target thickness of 20 μm]
(2) 20 cycles of a corrosion resistance test shown in FIG. 3 was made on the sample subjected to the above treatments. One test cycle is 1 week.
(3) After the above corrosion resistance test (20 cycles), the sample was opened to obtain the red rust growth ratio of the overlapping portion so as to evaluate its corrosion resistance based on the following criteria. The rest rust growth ratio is the proportion of the surface area of a red rust growing portion.

<Criteria of Corrosion Resistance>
red rust growth ratio: x, when it is 7% or more (low corrosion resistance)
red rust growth ratio: Δ, when it is 4% or more and less than 7% (superior to x and allowable range)
red rust growth ratio: ○, when it is 1% or more and less than 4% (good corrosion resistance)
red rust growth ratio: ⊚, when it is less than 1% (superior to ○ and excellent)

[3] Evaluation Results of Resin Coated Metal Sheets

The results of the above evaluation tests are shown in Table 3. The weldability and corrosion resistance of the resin coated metal sheet of Comparative Example 1 are evaluated as ⊚ (excellent) but the formability of the resin coated metal sheet is evaluated as x (poor). The formability and weldability of the resin coated metal sheets of Comparative Examples 2 and 3 are evaluated as ⊚ (excellent) but the corrosion resistance of the resin coated metal sheets is evaluated as x (low).

In contrast to this, the resin coated metal sheets of Examples 1 to 12 of the present invention are excellent in overall properties (overall evaluation results of formability, weldability and corrosion resistance) and excellent in all aspects. That is, they are evaluated as ⊚ in terms of formability, weldability and corrosion resistance (excellent formability, weldability and corrosion resistance) or ○ in any one of formability, weldability and corrosion resistance (good formability, weldability and corrosion resistance) and ⊚ in the other properties.

The resin coated metal sheets of Examples 13 to 19 of the present invention are superior to the resin coated metal sheets of Comparative Examples 1 to 3 in all aspects. That is, they are evaluated as Δ in any one of formability, weldability and corrosion resistance and ⊚ in the other properties.

TABLE 1

| | epoxy resin (solid content) | | | | | | curing agent solid content) | | | |
|---|---|---|---|---|---|---|---|---|---|---|
| | urethane modified resin 1 | urethane modified resin 2 | dimer acid modified resin | bisphenol A type resin 1 | bisphenol A type resin 2 | epoxy polyol | polyamide amine | blocked isocyanate 1 | blocked isocyanate 2 | butyl-etherified melamine resin |
| examples 1–7 | 100 | | | | | | | 45 | | |
| example 8 | 100 | | | | | | | | | 25 |
| example 9 | | 100 | | | | | 27 | | | |
| example 10 | | | | | | 100 | | | 40 | |
| example 11 | | | 30 | 70 | | | | | | 30 |
| example 12 | | 30 | 30 | 40 | | | | | | 30 |
| example 13 | | | | | 100 | | 100 | | | |
| examples 14–19, comparative examples 1–3 | 100 | | | | | | | 45 | | | unit (parts by weight)

TABLE 2

| | conductive filler | | | | corrosion preventing additives | | | | | anti-settling |
|---|---|---|---|---|---|---|---|---|---|---|
| | FeP | | | | | calcium ion | amorphous | | | |
| resin/curing agent | max 12 μm | max 16 μm | max 22 μm | Zn | aluminum triphosphate | exchange silica | magnesium silicate | zinc molybdate | calcium borosilicate | agent fumed silica |
| example 1 | 48 | 40 | | | 10 | | | | | 2 |
| example 2 | 43 | 50 | | | 5 | | | | | 2 |
| example 3 | 38 | 50 | | | 10 | | | | | 2 |
| example 4 | 23 | 50 | | | 25 | | | | | 2 |
| example 5 | 33 | 55 | | | 10 | | | | | 2 |

TABLE 2-continued

| | conductive filler | | | | corrosion preventing additives | | | | | anti-settling |
|---|---|---|---|---|---|---|---|---|---|---|
| | | FeP | | | | calcium ion | amorphous | | | |
| resin/curing agent | | max 12 μm | max 16 μm | max 22 μm | Zn | aluminum triphosphate | exchange silica | magnesium silicate | zinc molybdate | calcium borosilicate | agent fumed silica |
| example 6 | 38 | 50 | | | | | 10 | | | | 2 |
| example 7 | 38 | 50 | | | | | | 10 | | | 2 |
| example 8 | 38 | 50 | | | | 10 | | | | | 2 |
| example 9 | 38 | 50 | | | | 10 | | | | | 2 |
| example 10 | 38 | 50 | | | | 10 | | | | | 2 |
| example 11 | 38 | 50 | | | | 10 | | | | | 2 |
| example 12 | 38 | 50 | | | | 10 | | | | | 2 |
| example 13 | 38 | 50 | | | | 10 | | | | | 2 |
| comparative example 1 | 38 | | | | 50 | 10 | | | | | 2 |
| example 14 | 53 | 35 | | | | 10 | | | | | 2 |
| example 15 | 28 | 60 | | | | 10 | | | | | 2 |
| example 16 | 46 | 50 | | | | 2 | | | | | 2 |
| example 17 | 18 | 50 | | | | 30 | | | | | 2 |
| example 18 | 38 | | 50 | | | 10 | | | | | 2 |
| example 19 | 38 | | | 50 | | 10 | | | | | 2 |
| comparative example 2 | 38 | 50 | | | | | | | 10 | | 2 |
| comparative example 3 | 38 | 50 | | | | | | | | 10 | 2 | unit (% by weight)

TABLE 3

| | formability | weldability | corrosion resistance |
|---|---|---|---|
| example 1 | ⊚ | ◯ | ⊚ |
| example 2 | ⊚ | ⊚ | ◯ |
| example 3 | ⊚ | ⊚ | ⊚ |
| example 4 | ◯ | ⊚ | ⊚ |
| example 5 | ◯ | ⊚ | ⊚ |
| example 6 | ⊚ | ⊚ | ◯ |
| example 7 | ⊚ | ⊚ | ⊚ |
| example 8 | ⊚ | ⊚ | ⊚ |
| example 9 | ⊚ | ⊚ | ⊚ |
| example 10 | ⊚ | ⊚ | ⊚ |
| example 11 | ⊚ | ⊚ | ⊚ |
| example 12 | ⊚ | ⊚ | ⊚ |
| example 13 | Δ | ⊚ | ⊚ |
| comparative example 1 | X | ⊚ | ⊚ |
| example 14 | ⊚ | Δ | ⊚ |
| example 15 | Δ | ⊚ | ⊚ |
| example 16 | ⊚ | ⊚ | Δ |
| example 17 | Δ | ⊚ | ⊚ |
| example 18 | Δ | ⊚ | ⊚ |
| example 19 | Δ | ⊚ | ⊚ |
| comparative example 2 | ⊚ | ⊚ | X |
| comparative example 3 | ⊚ | ⊚ | X |

What is claimed is:

1. A resin coated metal sheet comprising:
a metal sheet; and
a resin layer comprising an epoxy resin, said resin layer being formed on said metal sheet,
wherein said resin layer comprises iron phosphide;
at least one selected from the group consisting of aluminum triphosphate, calcium ion exchange silica and amorphous magnesium silicate compound; and
a curing agent;
wherein said metal sheet is a galvanized steel sheet;
wherein said epoxy resin is at least one of a urethane modified epoxy resin and a dimer acid modified epoxy resin; and
wherein the content of said iron phosphide in said resin layer is 40 to 55 wt %.

2. The resin coated metal sheet according to claim 1, wherein the content of said at least one selected from the group consisting of aluminum triphosphate, calcium ion exchange silica and amorphous magnesium silicate compound is 5 to 25 wt %.

3. The resin coated metal sheet according to claim 1, wherein the maximum particle diameter of said iron phosphide is 15 μm or less.

4. The resin coated metal sheet according to claim 1, wherein the maximum particle diameter of said iron phosphide is 6 μm.

5. The resin coated metal sheet according to claim 1, wherein the content of calcium in said calcium ion exchange silica is 1 to 10 wt %.

6. The resin coated metal sheet according to claim 1, wherein said galvanized steel sheet is a galvannealed steel sheet.

7. The resin coated metal sheet according to claim 1, wherein said galvanized steel sheet is an electro-galvanized steel sheet.

8. The resin coated metal sheet according to claim 7, wherein said electro-galvanized steel sheet further comprises a chromate or non-chromate phosphoric-acid based undercoat.

9. The resin coated metal sheet according to claim 8, wherein said undercoat is formed on said electro-galvanized steel sheet before the formation of said resin layer.

10. The resin coated metal sheet according to claim 1, wherein the maximum particle diameter of said aluminum triphosphate, calcium ion exchange silica or amorphous magnesium silicate compound is 10 μm or less.

11. A resin coated metal sheet comprising:
a metal sheet; and
a resin layer comprising an epoxy resin, said resin layer being formed on said metal sheet,
wherein said resin layer comprises iron phosphide;
at least one selected from the group consisting of aluminum triphosphate, calcium ion exchange silica and amorphous magnesium silicate compound; and
a curing agent;
wherein said metal sheet is a galvanized steel sheet;

wherein said epoxy resin is at least one of a urethane modified epoxy resin and a dimer acid modified epoxy resin; and wherein the content of said at least one selected from the group consisting of aluminum triphosphate, calcium ion exchange silica and amorphous magnesium silicate compound is 5 to 25 wt %.

12. A resin coated metal sheet comprising:

a metal sheet; and a resin layer comprising an epoxy resin, said resin layer being formed on said metal sheet, wherein said resin layer comprises iron phosphide;

at least one selected from the group consisting of aluminum triphosphate, calcium ion exchange silica and amorphous magnesium silicate compound; and a curing agent;

wherein said metal sheet is a galvanized steel sheet;

wherein said epoxy resin is at least one of a urethane modified epoxy resin and a dimer acid modified epoxy resin; and wherein the maximum particle diameter of said iron phosphide is 15 μm or less.

* * * * *

UNITED STATES PATENT AND TRADEMARK OFFICE
CERTIFICATE OF CORRECTION

PATENT NO.         : 7,033,678 B2
APPLICATION NO. : 10/831231
DATED              : April 25, 2006
INVENTOR(S)        : Nakanishi et al.

Page 1 of 1

It is certified that error appears in the above-identified patent and that said Letters Patent is hereby corrected as shown below:

On the title page, Item (73), the Assignee Information is incorrect. Item (73) should read:

-- (73)   Assignee: Kabushiki Kaisha Kobe Seiko Sho
                (Kobe Steel, Ltd.) Kobe (JP)--

Signed and Sealed this

Eighth Day of August, 2006

JON W. DUDAS
*Director of the United States Patent and Trademark Office*

UNITED STATES PATENT AND TRADEMARK OFFICE
CERTIFICATE OF CORRECTION

PATENT NO.         : 7,033,678 B2
APPLICATION NO. : 10/831231
DATED              : April 25, 2006
INVENTOR(S)        : Nakanishi et al.

Page 1 of 1

It is certified that error appears in the above-identified patent and that said Letters Patent is hereby corrected as shown below:

On the title page, Item (73), the Assignee Information is incorrect. Item (73) should read:

-- (73)   Assignee: **Kabushiki Kaisha Kobe Seiko Sho
          (Kobe Steel, Ltd.)**  Kobe (JP)--

Signed and Sealed this

Twenty-ninth Day of August, 2006

JON W. DUDAS
*Director of the United States Patent and Trademark Office*